(12) United States Patent
Sarlioglu

(10) Patent No.: US 7,095,636 B2
(45) Date of Patent: Aug. 22, 2006

(54) ELECTROMAGNETIC INTERFERENCE FILTER FOR AN AUTOTRANSFORMER

(75) Inventor: Bulent Sarlioglu, Torrance, CA (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 10/941,512

(22) Filed: Sep. 15, 2004

(65) Prior Publication Data

US 2006/0056207 A1    Mar. 16, 2006

(51) Int. Cl.
*H02M 1/14* (2006.01)
*H02M 1/12* (2006.01)

(52) U.S. Cl. .............................. 363/39; 363/44; 363/48

(58) Field of Classification Search ................. 363/39, 363/44, 45, 46, 47, 48
See application file for complete search history.

(56) References Cited

U.S. PATENT DOCUMENTS

| | | | |
|---|---|---|---|
| 3,681,612 A * | 8/1972 | Vogl et al. ................. | 307/105 |
| 4,686,614 A | 8/1987 | Costello | |
| 4,730,243 A | 3/1988 | Glennon | |
| 4,967,334 A * | 10/1990 | Cook et al. ................. | 363/34 |
| 5,459,392 A | 10/1995 | Mandelcorn | |
| 5,483,136 A | 1/1996 | Marcinkiewicz | |
| 5,499,178 A * | 3/1996 | Mohan ....................... | 363/39 |
| 5,515,261 A | 5/1996 | Bogdan | |
| 5,552,976 A | 9/1996 | Munro et al. | |
| 5,594,632 A | 1/1997 | Barrett | |
| 5,684,678 A * | 11/1997 | Barrett ....................... | 363/17 |
| 5,844,790 A | 12/1998 | Jacobs et al. | |
| 5,905,642 A * | 5/1999 | Hammond ................... | 363/37 |
| 6,031,299 A | 2/2000 | Stumfall et al. | |
| 6,055,164 A | 4/2000 | Chen et al. | |
| 6,122,183 A | 9/2000 | He et al. | |
| 6,140,866 A | 10/2000 | Wang | |
| 6,381,153 B1 | 4/2002 | Brussels | |
| 6,414,859 B1 | 7/2002 | Zhang | |

* cited by examiner

*Primary Examiner*—Bao Q. Vu
(74) *Attorney, Agent, or Firm*—Oral Caglar, Esq.

(57) ABSTRACT

A filter system for attenuating electromagnetic interference (EMI) of an autotransformer-based rectification system that utilizes the leakage inductance of the autotransformer and one or more capacitors connected on the secondary side and optionally one or more differential mode inductors and input capacitors connected on the primary side to form a differential mode EMI filter. This configuration reduces the size, weight, and cost of the differential mode EMI filter when compared with a differential filter formed by placing the inductors and capacitors on the primary side.

21 Claims, 11 Drawing Sheets

ELECTROMAGNETIC INTERFERENCE FILTER FOR AN AUTOTRANSFORMER

FIELD OF THE INVENTION

The invention relates generally to an electromagnetic interference filter for aircraft power systems, and more particularly to an electromagnetic interference filter to be used with multi-pulse rectification systems for achieving power quality.

BACKGROUND

Various passive and active solutions have been developed to achieve a specified power quality for aircraft systems. Some passive solutions include passive filters, multi-pulse transformers, and multi-pulse autotransformers. Some active solutions include active rectifiers, active filters, and matrix converters. Multi-pulse autotransformers are generally more desirable than multi-pulse transformers in aircraft applications because of their smaller size, weight and costs. Multi-pulse autotransformers can be configured as 12-pulse, 18-pulse, 24-pulse, and 30-pulse rectification systems, and even more for aircraft applications. When 6-pulse rectifiers are paralleled, interphase transformers are normally used to achieve current sharing between the bridges, otherwise each bridge is required to carry the full current. It is also possible to achieve multi-pulse rectification systems whereby the conduction angle of diodes is not limited to 120 degrees. The advantage of this type is that they do not need to use interphase transformers. For example, a 40-degree conduction of diodes can be achieved by using a properly configured 18-pulse autotransformer. Similarly, a 30-degree conduction of diodes can be achieved by using a properly configured 12-pulse autotransformer. These solutions can be used with alternating current (AC) power systems that operate with constant voltage constant frequency (CVCF) or constant voltage variable frequency (CVVF) to provide power to aircraft systems. The CVCF systems typically operate at 400 Hz for commercial aircrafts.

Emissions from these AC power systems may produce radiated and conducted electromagnetic interference (EMI) for aircraft systems. For example, the emissions may transmit EMI distortion back into the AC power systems. Therefore, maintaining low distortion is important for the proper operation of devices connected to the AC power systems. EMI standards related to aircrafts vary but may include Mil-Std-461E, RTCA/DO160D, and IEC 61000-4-3. For this reason, as well as others, EMI requirements are placed on AC power systems by aircraft manufacturers. Similarly, power quality standards are placed on AC power systems by aircraft manufacturers to lower the AC current harmonics withdrawn by the loads.

Thus, it should be appreciated that a need exists for an EMI filter system that reduces interference in aircraft applications. The invention fulfills this need as well as others.

SUMMARY OF THE INVENTION

The invention relates to systems and methods for an EMI filter. The invention utilizes the leakage inductance of the autotransformer and one or more capacitors on the secondary side and optionally one or more differential mode inductors and capacitors on the primary side to form a differential mode EMI filter. This configuration reduces the size, weight, and cost of the differential mode EMI filter when compared with a differential filter formed by placing the inductors and capacitors on the primary side only. In one embodiment, the invention is an EMI filter system to be used with a rectification system for attenuating electromagnetic interference. The EMI filter system includes an autotransformer having first, second and third input nodes and first, second and third output nodes. The EMI filter system also includes a first output capacitor coupled to the first and second output nodes and a second output capacitor coupled to the second and third output nodes.

In particular, and by way of example only, one embodiment of the invention is a rectification and EMI filter system that may include a power distribution system for providing a plurality of currents, an AC filter having a plurality of inductors coupled to the power distribution system for receiving the plurality of currents, and a plurality of input capacitors coupled to the plurality of inductors. The system may also include a plurality of output capacitors, an autotransformer having a plurality of primary windings coupled to the plurality of input capacitors and a plurality of secondary windings coupled to the plurality of output capacitors, and a rectifier device coupled to the plurality of secondary windings.

These and other features and advantages of the embodiments of the invention will become apparent from the following detailed description, taken in conjunction with the accompanying drawings, which illustrate, by way of example the principles of the invention.

DETAILED DESCRIPTION OF THE PRESENTLY PREFERRED EMBODIMENTS

Systems and methods that implement the embodiments of the various features of the invention will now be described with reference to the drawings. The drawings and the associated descriptions are provided to illustrate embodiments of the invention and not to limit the scope of the invention. Reference in the specification to "one embodiment" or "an embodiment" is intended to indicate that a particular feature, structure, or characteristic described in connection with the embodiment is included in at least an embodiment of the invention. The appearances of the phrase "in one embodiment" in various places in the specification are not necessarily all referring to the same embodiment. Throughout the drawings, reference numbers are re-used to indicate correspondence between referenced elements. In addition, the first digit of each reference number indicates the figure in which the element first appears.

Figure 1:
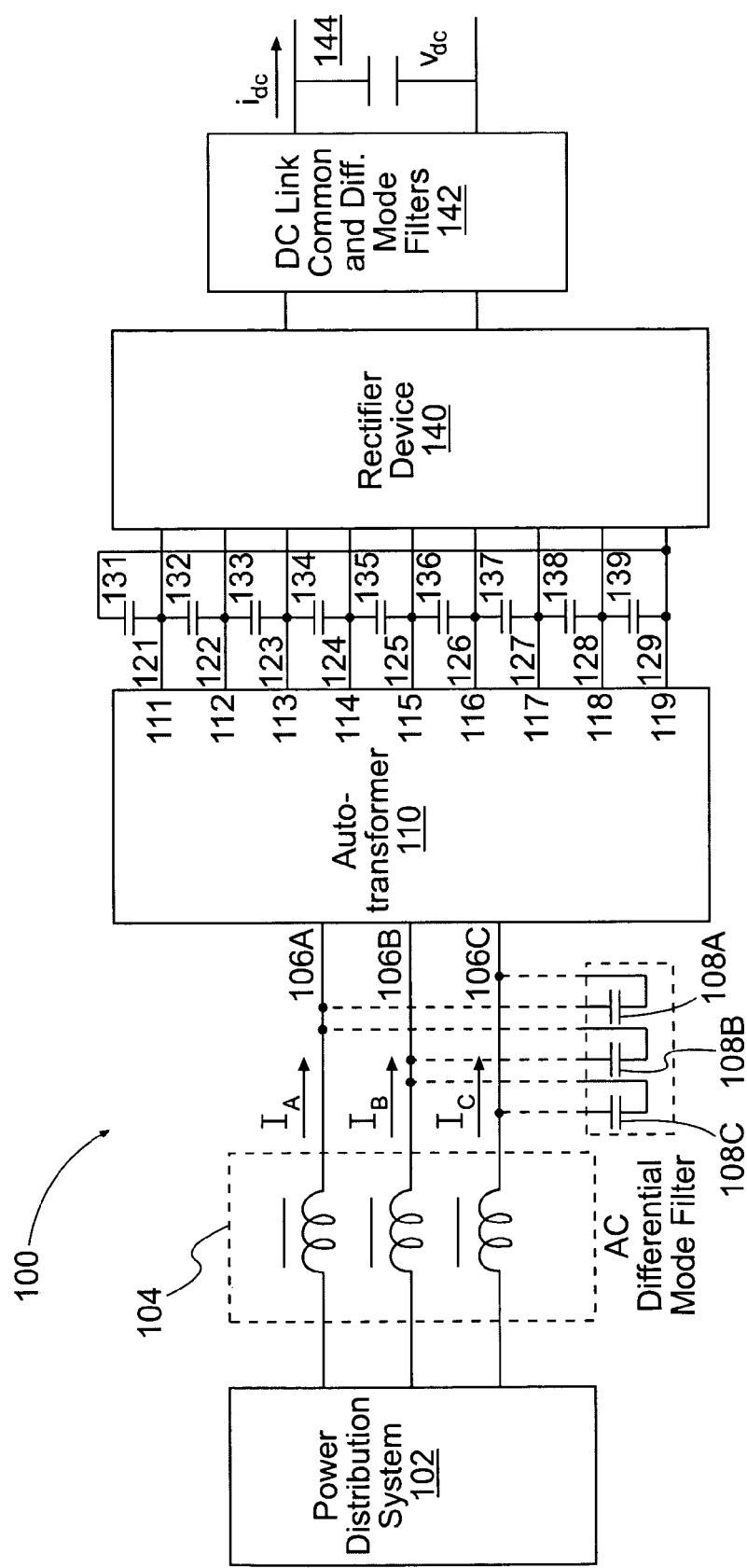
FIG. 1 is a block diagram of a rectification system and EMI filter that may include a power distribution system, an AC filter, one or more input lines, one or more input capacitors, an autotransformer having one or more output terminals, one or more output lines, one or more output capacitors, a rectifier device, a DC filter, and an output according to an embodiment of the invention.

Referring now more particularly to the drawings, FIG. 1 is a block diagram of a rectification and EMI filter system 100 that may include a power distribution system 102, an AC filter 104, one or more input lines 106, one or more input capacitors 108, an autotransformer 110 having one or more output terminals 111–119, one or more output lines 121–129, one or more output capacitors 131–139, a rectifier device 140, a DC filter 142, and an output 144. The power distribution system 102 may be a multi-phase power distribution system (e.g., a three-phase power distribution system). The power distribution system 102 may include an AC electric generator coupled with a main engine output shaft thereby providing a constant voltage-variable frequency three phase output to the AC filter 104.

Figure 2:
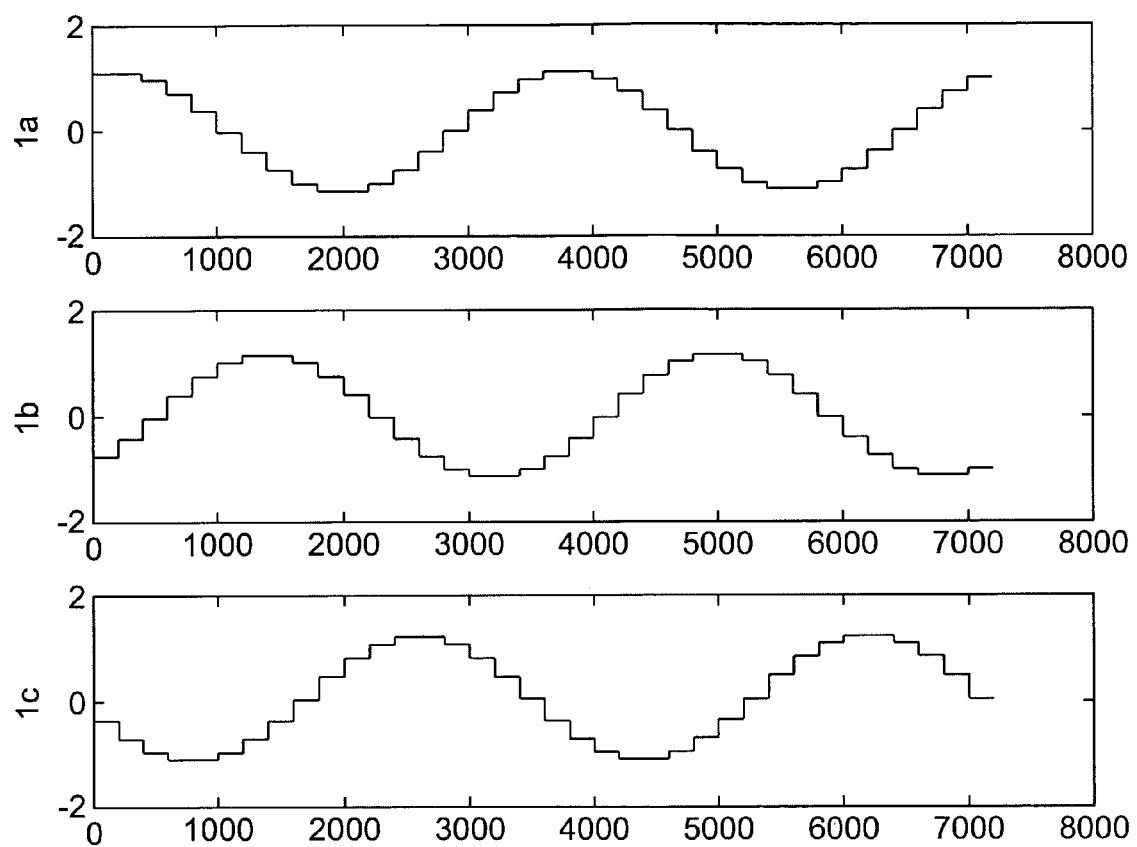
FIG. 2 are graphs illustrating three waveforms representing three input currents that are fed into the autotransformer of FIG. 1 according to an embodiment of the invention.

The AC filter 104 may be a three-phase inductance and/or EMI filter (e.g., an AC differential mode filter) configured to attenuate harmonic distortion of the current for satisfying EMI and power quality requirements. In one embodiment, the AC filter 104 includes three (3) single-phase inductors. The single-phase inductors can be preferably wound on a C-core using, for example, laminations or tape-wound structures. Preferably, the three (3) inductors can be one three-phase inductor. The three-phase inductor can be preferably wound on an E-core using, for example, laminations or tape-wound structures. Each inductor is coupled to a single phase of the power distribution system 102. For example, if a three-phase power distribution system 102 is implemented, then the AC filter 104 includes three (3) inductors. The value of each inductor depends on the characteristic and features of the rectification and EMI filter system 100 and desired differential mode EMI attenuation. For example, in one embodiment, the value of the inductors is approximately 50 microHenry (uH). The AC filter 104 outputs three (3) input currents (e.g., $I_A$, $I_B$, and $I_C$) on input lines 106A, 106B, and 106C, respectively, when three (3) inductors are implemented. The graphs shown in FIG. 2 illustrate three waveforms representing three (3) input currents that are fed into the autotransformer 110.

The one or more input capacitors 108 are optional and may be coupled between one or more of the input lines 106A, 106B, and 106C. In one embodiment, a first input capacitor 108A is coupled to the input lines 106A and 106C, a second input capacitor 108B is coupled to the input lines 106A and 106B, and a third input capacitor 108C is coupled to the input lines 106B and 106C. The input lines 106A, 106B, and 106C are used to connect the AC filter 104 to the autotransformer 110. The current from the AC filter 104 travels through the one or more input capacitors 108 and into the autotransformer 110. The combination of the one or more inductors of the AC filter 104 and the one or more input capacitors 108 produces a LC filter.

Figure 3:
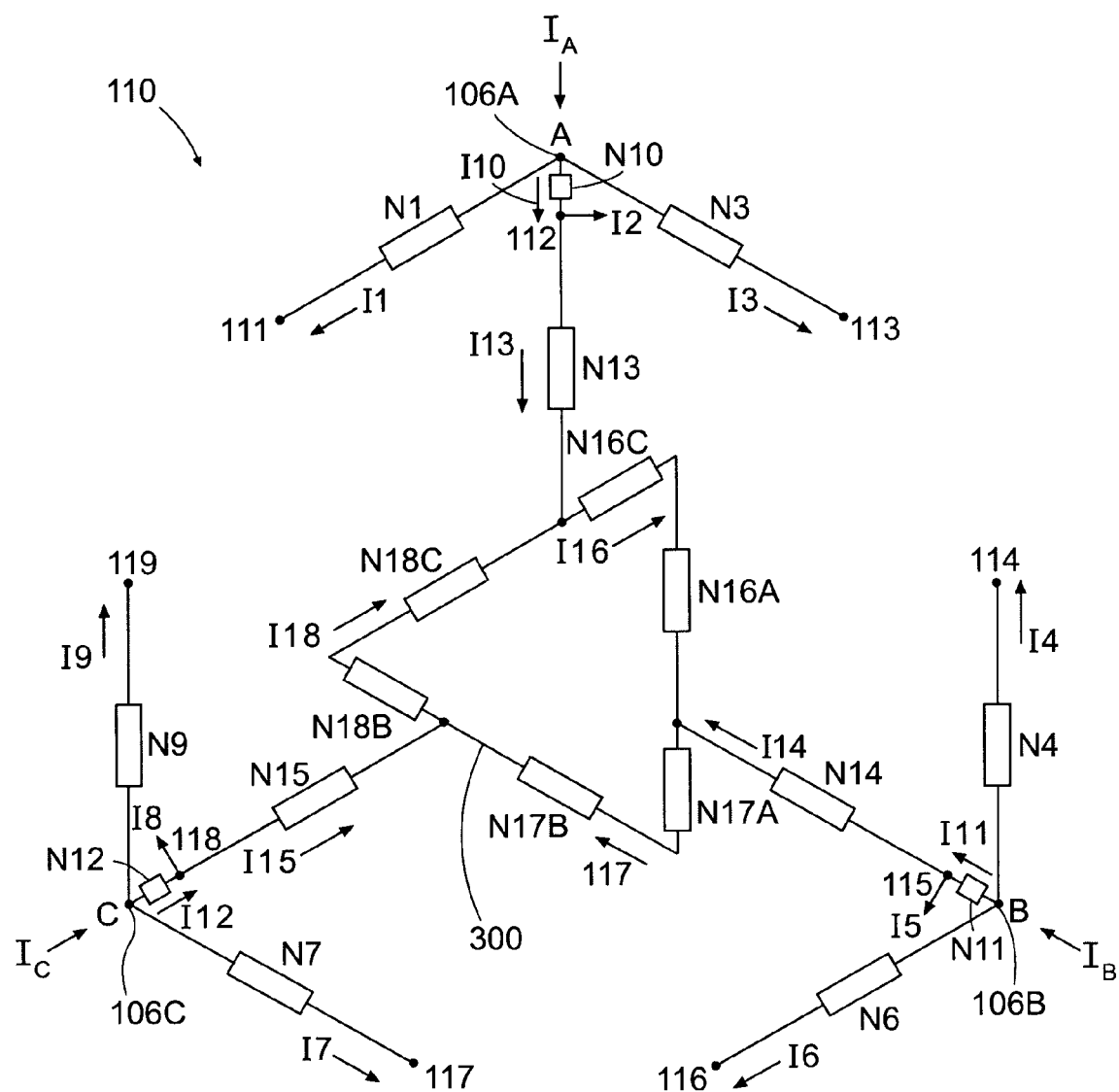
FIG. 3 is an example of a vector block diagram of a winding circuit for the autotransformer that can be used in FIG. 1 according to an embodiment of the invention.

FIG. 3 is an example of a vector block diagram of a winding circuit for the autotransformer 110 that can be used in FIG. 1. The autotransformer 110 is an example of an eighteen (18) pulse rectification autotransformer. Other transformers (e.g., 12- and 18-pulse transformers) having different vector block diagrams can be used in place of the autotransformer shown in FIG. 3. The autotransformer 110 minimizes characteristic harmonics (e.g., the lower harmonics 5th, 7th, 11th, and 13th) of the input currents (e.g., $I_A$, $I_B$, and $I_C$) received from the AC filter 104. The three input currents are fed into nodes A, B, and C, respectively, of the autotransformer 110. In one embodiment, the autotransformer 110 has at least one inner delta winding circuit 300 configured to circulate triplen harmonics resulting in a reduced total harmonic distortion (THD) and an equivalent transformer kVA rating that is significantly lower than those of typical autotransformers found in similar circuits. This reduction in equivalent kVA results in savings in size, weight, and costs associated with the autotransformer 110.

In one embodiment, the autotransformer 110 may include a plurality of windings configured to provide a series of output voltage vectors approximately 40 electrical degrees apart while circulating the triplen harmonic currents within the inner delta winding circuit 300 to reduce harmonic effects on the input currents. The plurality of windings may include a series of wye windings that are configured to provide a constant length voltage vector for any given input voltage, and a series of delta windings that are configured to provide a variable length voltage vector based upon the delta windings turn ratio. The series of delta windings are electrically coupled with the series of wye windings to allow circulation of harmonic current values, including triplen harmonics, thereby reducing the harmonic current effect on the input currents.

Figure 4:
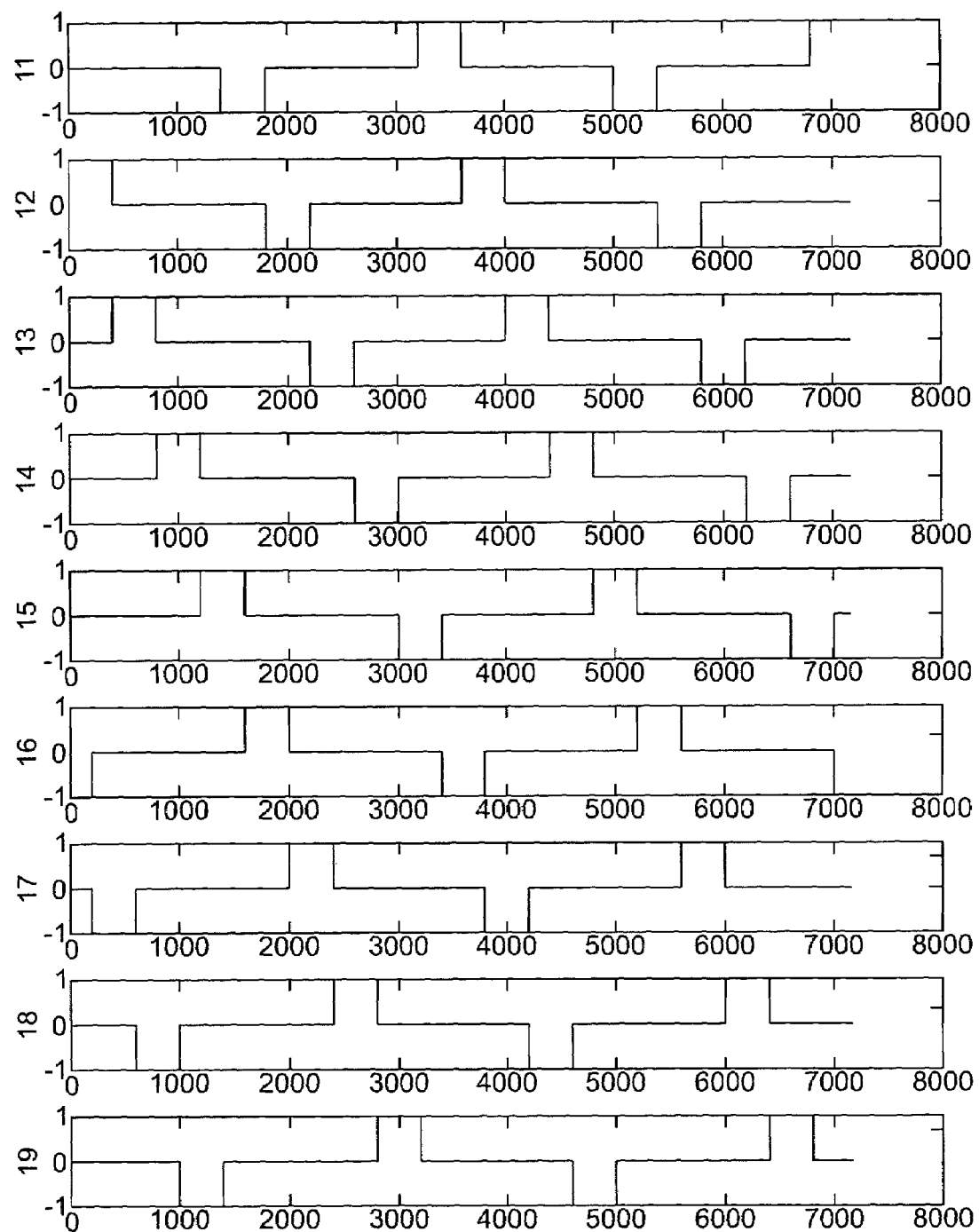
FIG. 4 are graphs illustrating nine waveforms representing nine output currents of the autotransformer that are fed into the rectifier device according to an embodiment of the invention.

The autotransformer 110 may include at least one primary side and at least one secondary side having associated primary taps A, B, and C and secondary taps 111–119, or electrical coupling points for connecting primary and secondary conductors. In one embodiment, the autotransformer 110 includes at least fifteen (15) quantitative winding vector blocks and nine (9) taps. The electrical coupling points of the primary and secondary windings establishes a series of associated output terminals 111–119. The graphs shown in FIG. 4 illustrate the nine (9) waveforms representing nine (9) output currents of the autotransformer 110 that are fed into the rectifier device 140.

The one or more output capacitors 131–139 are connected between the output terminals 111–119. Preferably, each output capacitor is connected between the two adjacent output terminals of the secondary windings, which are separated by about 40 electrical degrees. This is done to minimize the voltage rating of the capacitors, hence minimizing their size, weight, and cost. For example, a first output capacitor 131 may be coupled to the output lines 121 and 129 or between the output terminals 111 and 119, a second output capacitor 132 may be coupled to the output lines 121 and 122 or between the output terminals 111 and 112, a third output capacitor 133 may be coupled to the output lines 122 and 123 or between the output terminals 112 and 113, and so on. Hence, the one or more output capacitors 131–139 are coupled to the secondary windings of the autotransformer 110. Connecting the one or more output capacitors to adjacent output terminals of the secondary windings allows a lower voltage rating as compared to connecting the one or more output capacitors to non-adjacent output terminals. Because of the lower voltage of the adjacent terminals, the AC voltage rating of the one or more output capacitors 131–139 is significantly reduced compared to placing the one or more output capacitors 131–139 in the primary side input phases. Also, the size, weight, and costs of the inductors (of the AC filter 104) are reduced by adding the one or more capacitors 131–139 to the secondary side of the autotransformer 110.

When the autotransformer 110 is an eighteen (18) pulse rectification autotransformer, the rectifier device 140 may include three (3) 3-phase rectifiers. The rectifier device 140 is electrically coupled to the secondary windings of the autotransformer 110 using the one or more output lines 121–129 for providing a DC voltage to electrical equipment (not shown) attached to the output 144. The rectifier device 140 can be constructed by connecting semiconductor devices in a multibridge configuration to provide a DC output voltage. When diodes are used for rectification in an 18-pulse bridge rectifier, there are eighteen (18) diodes each having an anode and a cathode where nine (9) diode pairs that are electrically coupled in series are further coupled in parallel. The electrical coupling of the primary and secondary windings establishes the series of output terminals 111–119 that can be further connected to the mid-point connection of each series connected diode of the rectifier device 140. The leakage inductance of the autotransformer 110 is utilized to minimize or reduce the differential-mode EMI inductance needed from the AC filter 104. That is, the leakage inductance of the autotransformer 110 and the one or more output capacitors 131–139 positioned on the secondary side of the autotransformer 110 achieve compliance with the EMI requirements and reduces the weight, size, and cost of the rectification system 100. In one embodiment, the inductance weight from the AC filter 104 can be reduced from about 3.3 pounds to about 0.75 pounds due to the use of the leakage inductance of the autotransformer 110.

One of the largest components of the differential mode EMI emission in an AC input line are due to the diode commutation. The invention utilizes the leakage inductance of the autotransformer and optionally one or more differential mode inductors on the primary side and one or more capacitors on the secondary side to form a differential mode EMI filter. During the diode commutation of secondary line current from one diode to another, which creates a differential mode current, that is attenuated by the differential mode EMI filter, and the one or more output capacitors 131–139 essentially are charged and discharged due to the diode commutation. The diode commutation also includes the reverse recovery phenomena of the diodes where diode current continues to conduct in the negative direction until the reverse recovery charge built up in the P and N regions are fully removed. The connection of the secondary windings and the one or more output capacitors 131–139 produces a relatively low voltage rating of the one or more output capacitors 131–139.

The DC-link filter may include a common-mode inductance 142 and a differential mode inductance 143. The DC-link filter can be provided to further adjust the harmonics distortion of the current at the input for power quality and to help achieve EMI requirements.

Figure 5:
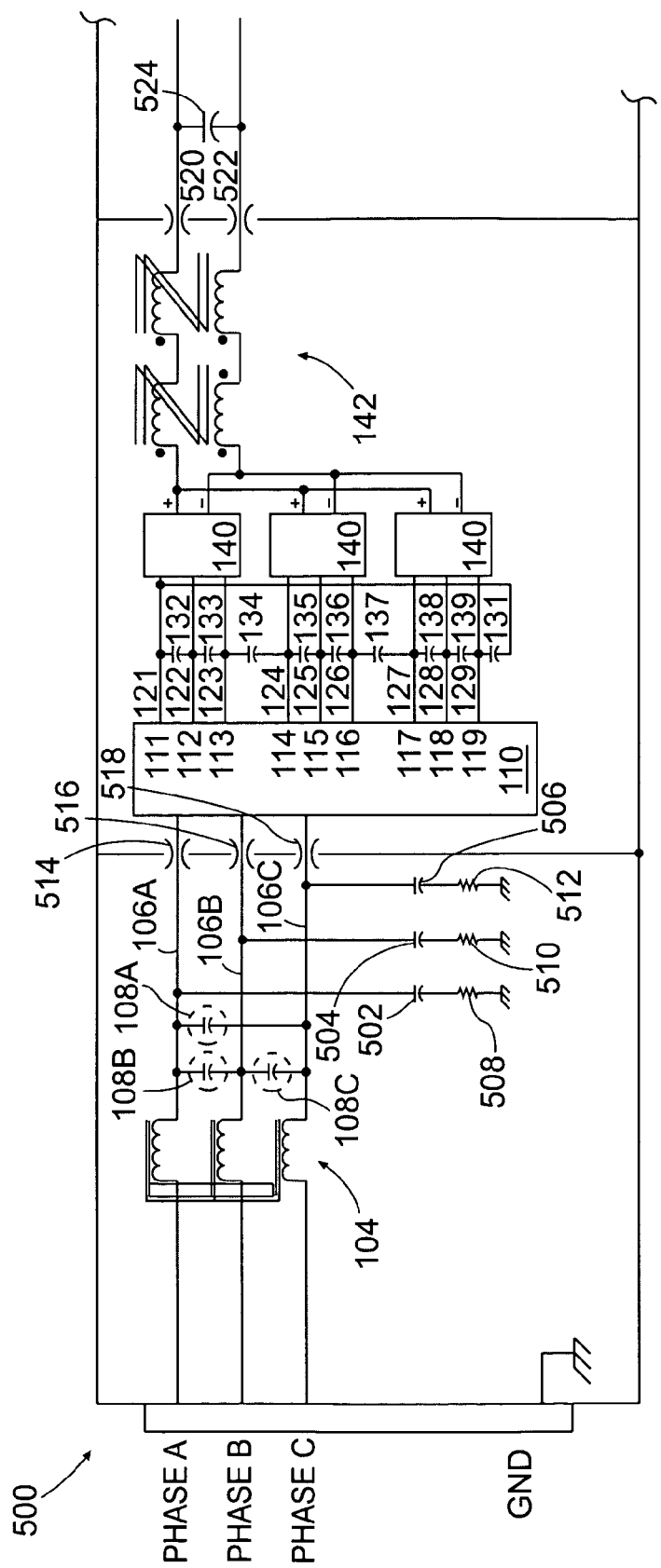
FIG. 5 is a block diagram of a rectification system and EMI filter similar to the rectification system of FIG. 1 according to an embodiment of the invention.

FIG. 5 is a block diagram of a rectification and EMI filter system 500 similar to the rectification system 100 of FIG. 1. The rectification and EMI filter system 500 is shown as an 18-pulse rectification system. The rectification and EMI filter system 500 may include a capacitor 502 coupled to the input line 106A, a capacitor 504 coupled to the input line 106B, and a capacitor 506 coupled to the input line 106C. The rectification and EMI filter system 500 may also include a resistor 508 coupled to the capacitor 502, a resistor 510 coupled to the capacitor 504, and a resistor 512 coupled to the capacitor 506. Each capacitor/resistor pair (e.g., 502 and 508) coupled to the input line (e.g., 106A) advantageously provides damping. In one embodiment, a capacitor 514 may be positioned in-line or in series with the input line 106A, a capacitor 516 may be positioned in-line or in series with the input line 106B, and a capacitor 518 may be positioned in-line or in series with the input line 106C. The capacitors 514, 516, and 518 advantageously provide a common mode path for common mode currents. Similarly, the capacitors 520 and 522 are used for suppressing the common mode currents at the DC bus. The capacitor 524 is the DC filter capacitor used to filter out the DC link voltage ripple.

Figure 6:
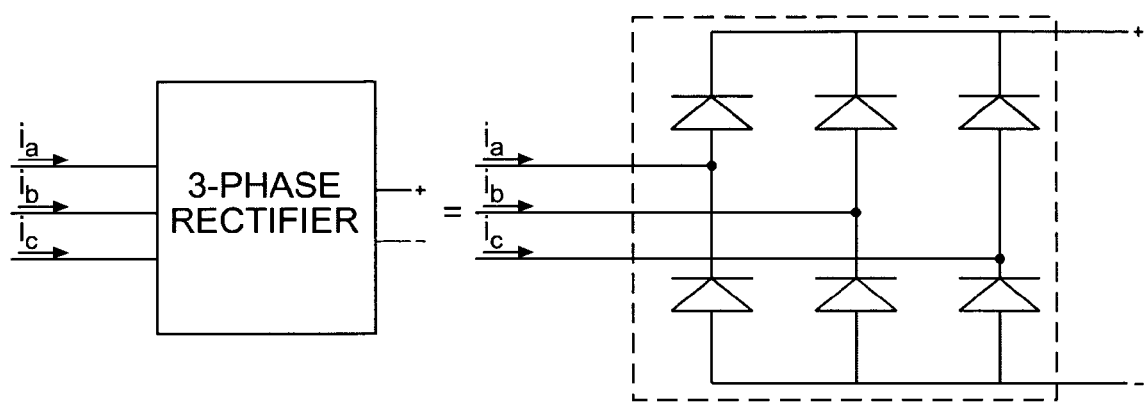
FIG. 6 is a schematic diagram of a 3-phase rectifier according to an embodiment of the invention.

FIG. 6 is a schematic diagram of a 3-phase rectifier 140. The 3-phase rectifier 140 may include six (6) diodes as shown in FIG. 6. The 3-phase rectifier 140 can be used with any of the rectification and EMI filter systems disclosed herein.

Figure 7:
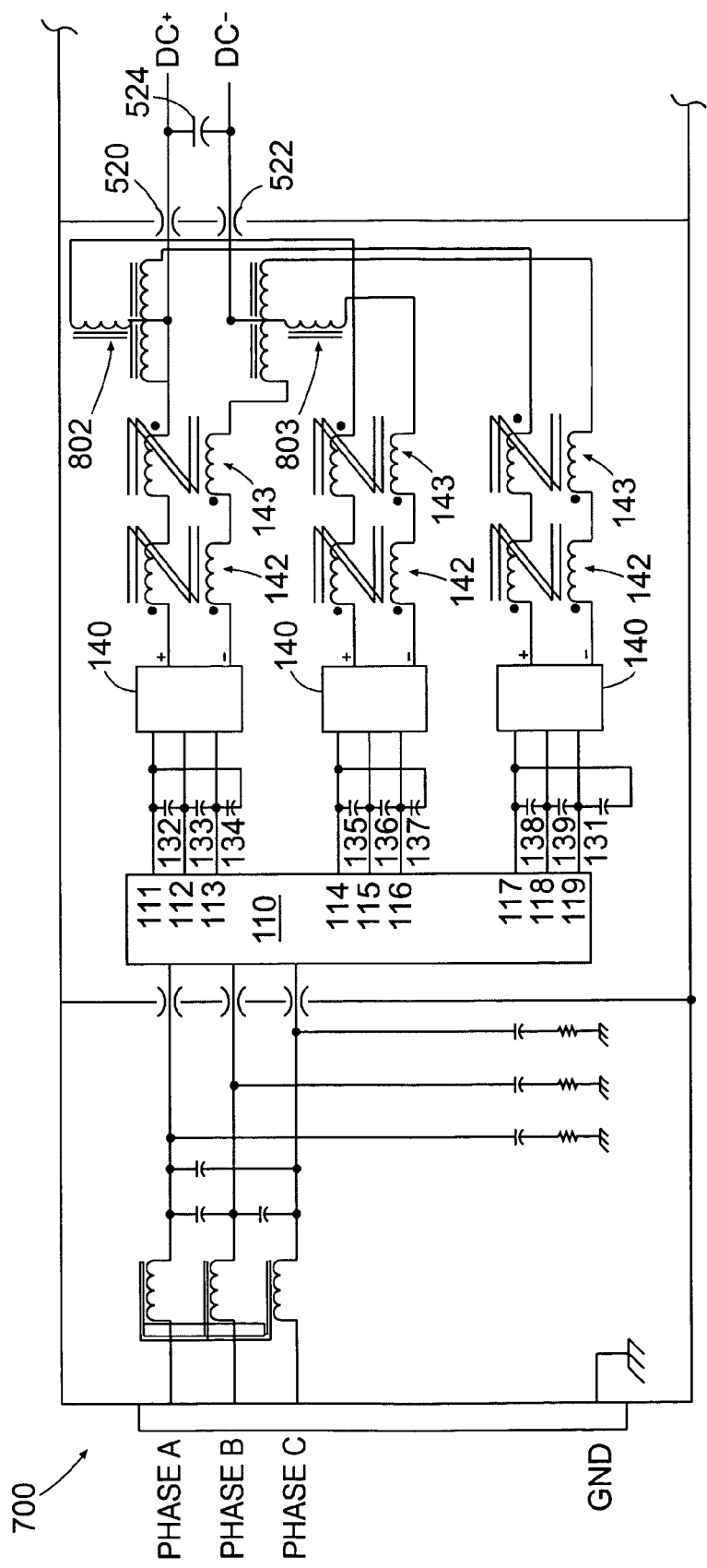
FIG. 7 is a schematic diagram of an 18-pulse+/−20 degree-phase shift rectification and EMI filter system with an interphase transformer according to an embodiment of the invention.

FIG. 7 is a schematic diagram of an 18-pulse+/−20 degree-phase shift rectification and EMI filter system 700 with an interphase transformers 802 and 803. The rectification and EMI filter system 700 is shown as an 18-pulse rectification system. The rectification and EMI filter system 700 is similar to the rectification and EMI filter system 500 shown in FIG. 5. The capacitors 132, 133, and 134 are tied to one rectifier device 140. The capacitors 131, 138, and 139 are tied to one rectifier device 140. The rectification and EMI filter system 700 may include a common mode inductor 142 and a differential mode inductor 143. The rectification and EMI filter system 700 includes the interphase transformers 802 and 803. The interphase transformers 802 and 803 may be wound on an E-core using, for example, laminations or tape-wound structures. The interphase transformers 802 and 803 achieve independent operation of diode bridge rectifiers where each diode conducts 120 degrees. The autotransformer 110 may include a plurality of windings configured to provide a series of output voltage vectors approximately +/−20 electrical degrees apart while circulating the triplen harmonic currents within the inner delta winding circuit 300 to reduce harmonic effects on the input currents.

Figure 8:
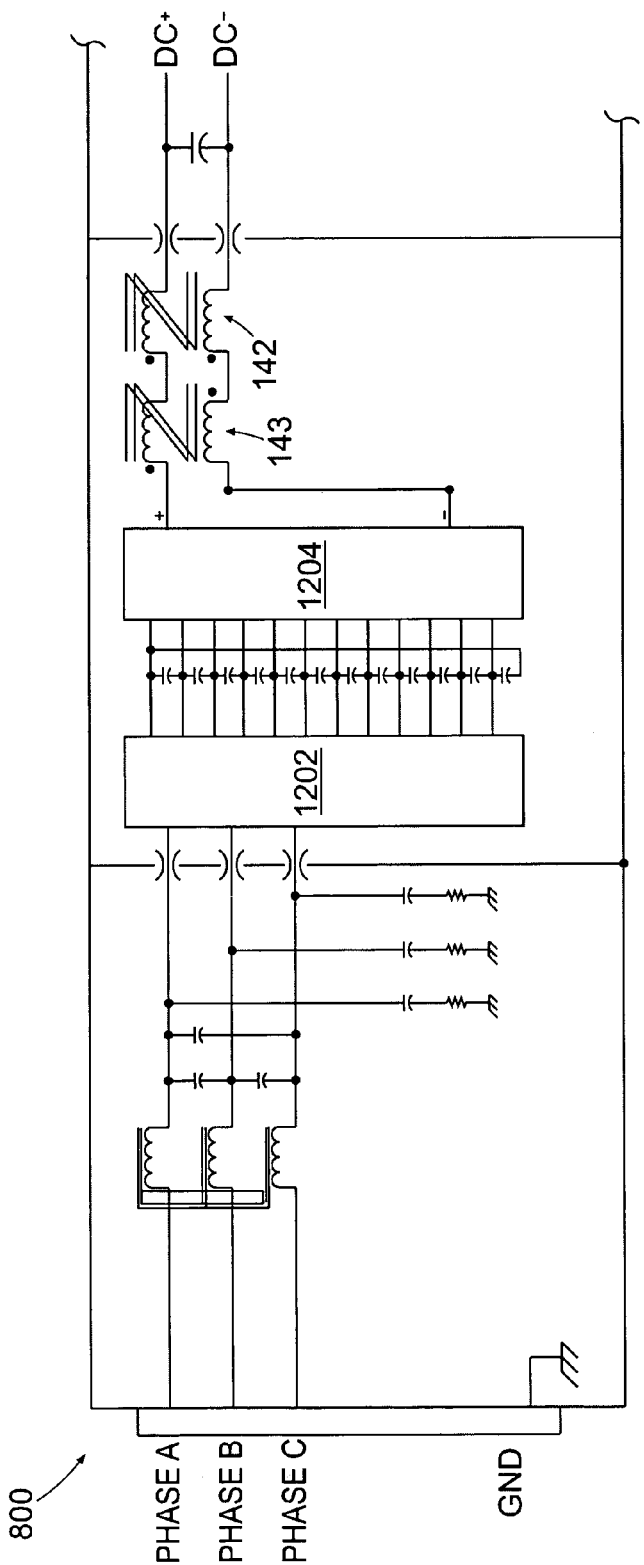
FIG. 8 is a schematic diagram of an 12-pulse+/−30 degree-phase shift rectification and EMI filter system according to an embodiment of the invention.
Figure 9:
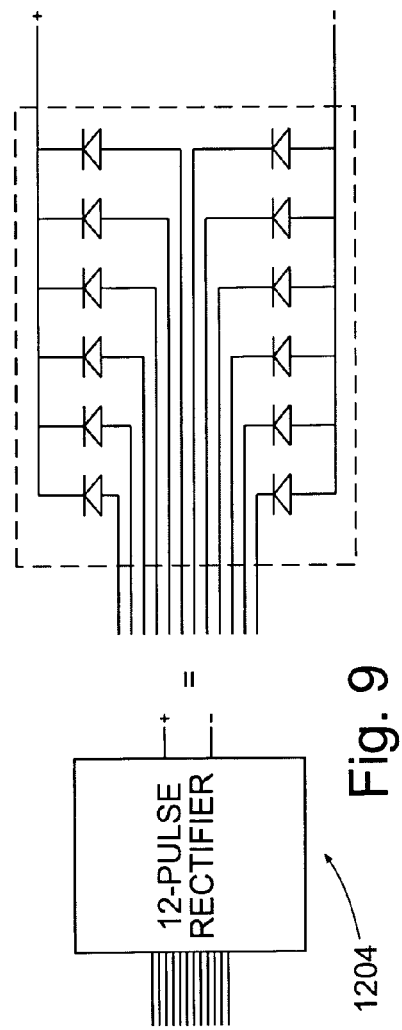
FIG. 9 is a schematic diagram of a 12-pulse rectifier according to an embodiment of the invention.

FIG. 8 is a schematic diagram of a 12-pulse+/−30 degree-phase shift rectification and EMI filter system 800. The rectification and EMI filter system 800 is shown as a 12-pulse rectification system. The rectification and EMI filter system 800 is similar to the rectification and EMI filter system 500 shown in FIG. 5. The rectification and EMI filter system 800 includes a 12-pulse autotransformer 1202 and a 12-pulse rectifier 1204 as shown in FIG. 9. The autotransformer 1202 may include a plurality of windings configured to provide a series of output voltage vectors approximately +/−30 electrical degrees apart. Each diode conducts 30 degrees.

FIG. 9 is a schematic diagram of a 12-pulse rectifier 1204. The 12-pulse rectifier 1204 may include twelve (12) diodes as shown in FIG. 9. The 12-pulse rectifier 1204 can be used with any of the rectification and EMI filter systems disclosed herein.

Figure 10:
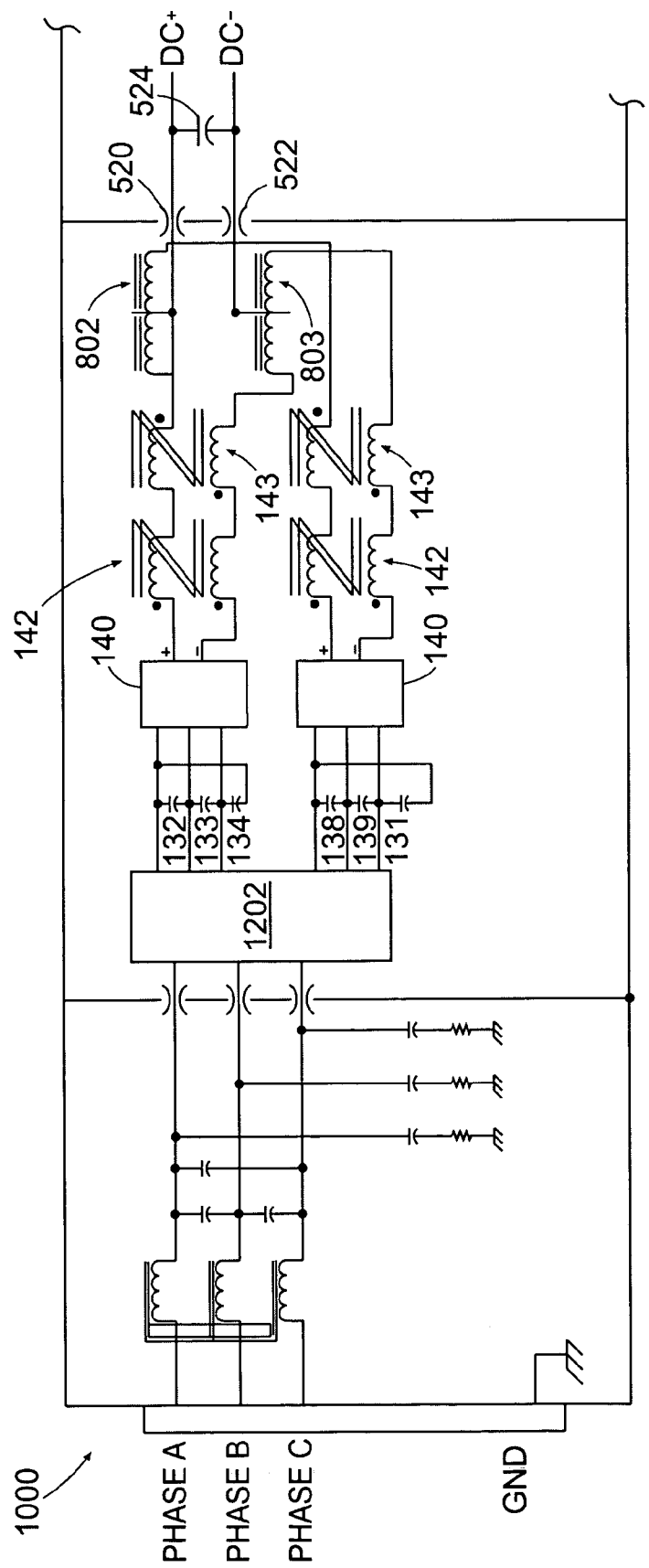
FIG. 10 is a schematic diagram of a 12-pulse+/−15 degree-phase shift rectification and EMI filter system with an interphase transformer according to an embodiment of the invention.

FIG. 10 is a schematic diagram of a 12-pulse+/−15 degree-phase shift rectification and EMI filter system 1000 with interphase transformers 802 and 803. The rectification and EMI filter system 1000 is shown as a 12-pulse rectification system. The rectification and EMI filter system 1000 is similar to the rectification and EMI filter system 500 shown in FIG. 5. The capacitors 132, 133, and 134 are tied to one rectifier device 140. The capacitors 131, 138, and 139 are tied to one rectifier device 140. The rectification and EMI filter system 1000 may include common mode inductors 142 and differential mode inductors 143. The rectification and EMI filter system 1000 includes a 12-pulse autotransformer 1202. The autotransformer 1202 may include a plurality of windings configured to provide a series of output voltage vectors approximately +/−15 electrical degrees apart. The interphase transformers achieve independent operation of diode bridge rectifiers where each diode conducts 120 degrees. The differential mode inductor 143 of the DC-link filter 142, is optional and can be removed by incorporating into the interphase transformers 802 and 803 for weight savings.

Figure 11:
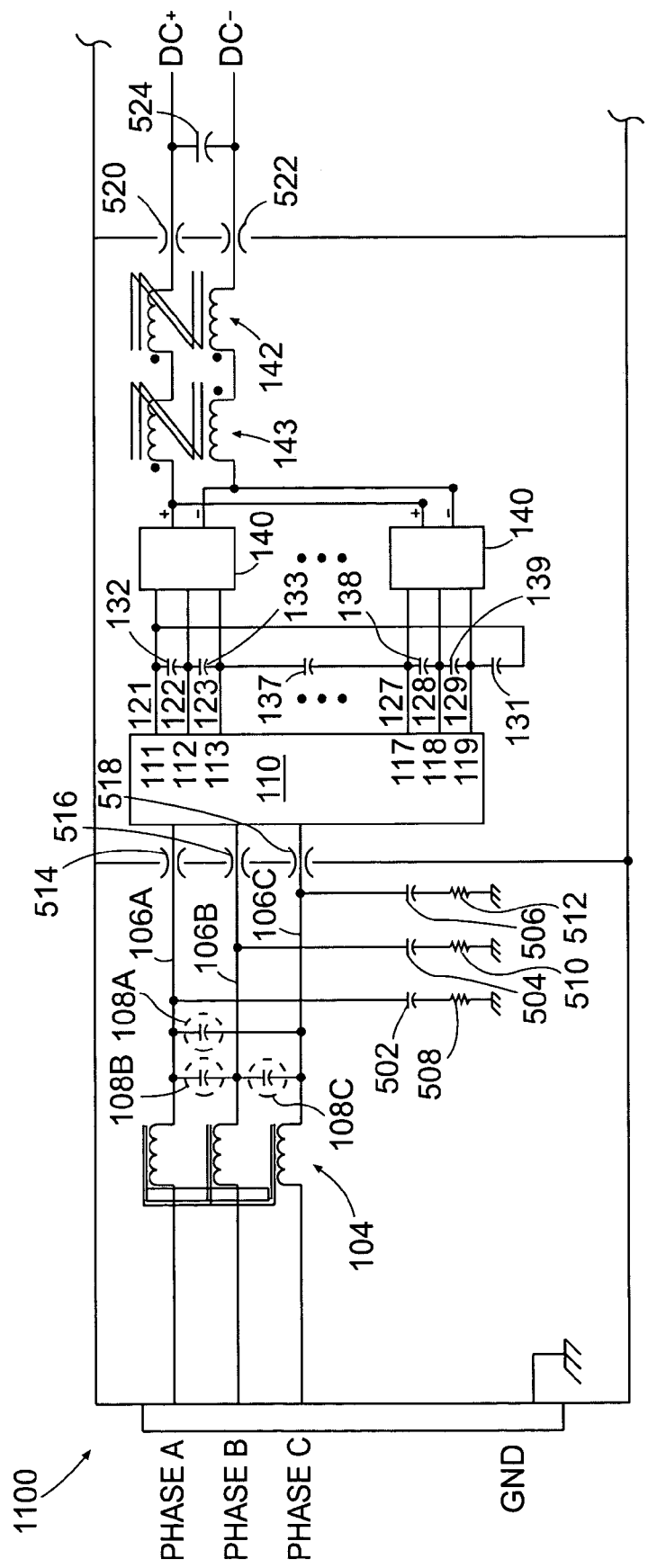
FIG. 11 is a schematic diagram of a general rectification and EMI filter system without an interphase transformer according to an embodiment of the invention.

FIG. 11 is a schematic diagram of a general rectification and EMI filter system 1100 without an interphase transformer. The rectification and EMI filter system 1100 is shown as a 3n-pulse rectification and EMI filter system. The rectification and EMI filter system 1100 is similar to the rectification EMI filter system 500 shown in FIG. 5. The rectification and EMI filter system 1100 has n 3-phase rectifiers 140 where n is an integer. The three dots signify that there can be n capacitors and n rectifiers 140. Since there is no interphase transformer in FIG. 11, the diode conductions are not limited to 120 degrees. Also, all the outputs of the rectifier device 140 are connected in parallel.

Figure 12:
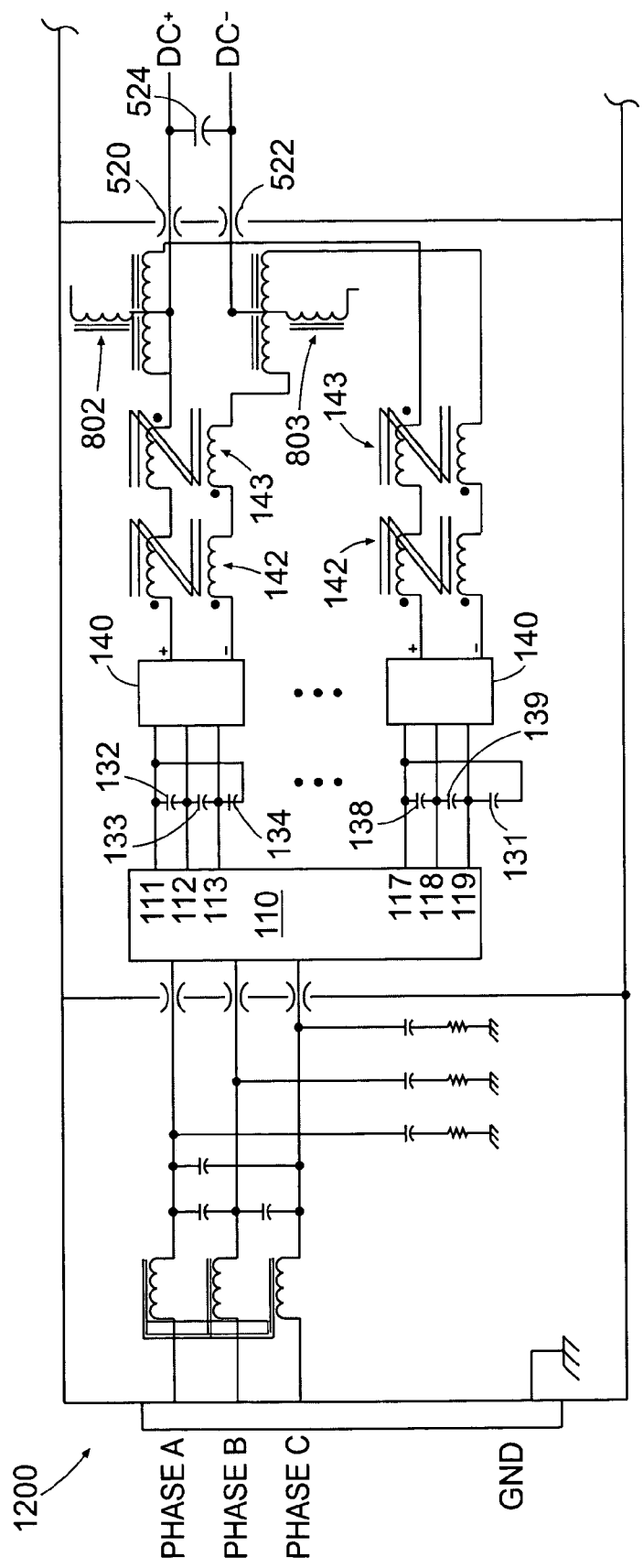
FIG. 12 is a schematic diagram of a general rectification and EMI filter system with an interphase transformer according to an embodiment of the invention.

FIG. 12 is a schematic diagram of a general rectification and EMI filter system 1200 with interphase transformers 802 and 803. The interphase transformer 802 and 803 may be wound on a E- or C-core using, for example, laminations or tape-wound structures. The rectification and EMI filter system 1200 is similar to the rectification system 700 shown in FIG. 7. The rectification and EMI filter system 1200 has n 3-phase rectifiers 140 and n DC-link common mode 142 and differential mode 143 filters where n is an integer. The three dots signify that there can be n capacitors, n rectifiers 140, n DC-link common mode 142 and n differential mode 143 inductors. The DC output of the n rectifier system is connected to interphase transformers 802 and 803. The DC-link common mode 142 and differential mode 143 filters may include one or more inductors. For example, the DC-link filter 142 may include one or more common mode inductors 142 and one or more differential mode inductors 143. The differential mode inductor 143, is optional and can be removed by incorporation into the interphase transformers 802 and 803 for weight savings. Due to the existence of the interphase transformers, the operations of the 3-phase rectifiers are isolated, and therefore, each diode conducts 120 degrees. Also, all the outputs of the rectifier device 140 are connected in parallel.

Although an exemplary embodiment of the invention has been shown and described, many other changes, combinations, omissions, modifications and substitutions, in addition to those set forth in the above paragraphs, may be made by one having skill in the art without necessarily departing from the spirit and scope of this invention. Accordingly, the present invention is not intended to be limited by the preferred embodiments, but is to be defined by reference to the appended claims.

What is claimed is:

1. A rectification and EMI fitter system for attenuating electromagnetic interference, comprising:
    a pulse rectification autotransformer having first, second and third input nodes and first, second and third output nodes;
    a first output capacitor coupled to the first and second output nodes;
    a second output capacitor coupled to the second and third output nodes; and
    wherein at least the first output capacitor and an inductance associated with at least an output side of the autotransformer form an LC filter circuit configured to attenuate the EMI prior to rectification without requiring a ground or neutral connection.

2. The system as defined in claim 1, wherein the autotransformer includes a plurality of windings configured to provide to the first, second and third output nodes a plurality of output voltage vectors arranged approximately 20 electrical degrees apart.

3. The system as defined in claim 1, wherein the autotransformer includes a plurality of windings configured to provide to the first, second and third output nodes a plurality of output voltage vectors arranged approximately 30 electrical degrees apart.

4. The system as defined in claim 1, wherein the autotransformer includes a plurality of windings configured to provide to the first, second and third output nodes a plurality of output voltage vectors arranged approximately 40 electrical degrees apart.

5. The system as defined in claim 1, further comprising a three-phase inductor coupled to the first, second and third input nodes.

6. The system as defined in claim 1, further comprising a first inductor coupled to the first input node.

7. The system as defined in claim 1, further comprising a second inductor coupled to the second input node.

8. The system as defined in claim 1, further comprising a third inductor coupled to the third input node.

9. The system as defined in claim 1, further comprising a first input capacitor coupled to the first and third input nodes.

10. The system as defined in claim 1, further comprising a second input capacitor coupled to the first and second input nodes.

11. The system as defined in claim 1, further comprising a third input capacitor coupled to the second and third input nodes.

12. The system as defined in claim 1, further comprising:
    a rectifier device coupled to the first, second and third output nodes;
    and an inductor coupled to the rectifier device.

13. The system as defined in claim 12, wherein the inductor is selected from a group consisting of a common mode inductor and a differential mode inductor.

14. The system as defined in claim 12, further comprising an interphase transformer coupled to the inductor.

15. A rectification and EMI filter system, comprising:
    an AC filter having a plurality of inductors for receiving a plurality of currents;
    a plurality of input capacitors coupled to the plurality of inductors;
    a plurality of output capacitors;

an autotransformer having a plurality of primary windings coupled to the plurality of input capacitors and a plurality of secondary windings coupled to the plurality of output capacitors; and wherein an inductance associated with at least an output side of the autotransformer is utilized to reduce the size of the plurality of inductors and forms an LC filter circuit with the plurality of output capacitors configured to attenuate the EMI prior to rectification without requiring a ground or neutral connection.

16. The system as defined in claim 15, further comprising a rectifier device coupled to the plurality of secondary windings.

17. The system as defined in claim 15, wherein the plurality of output capacitors are arranged adjacent to one another.

18. A rectification and EMI filter system, comprising:
first, second, and third inductors;
a first input line coupled to the first inductor;
a second input line coupled to the second inductor;
a third input line coupled to the third inductor;
an autotransformer coupled to the first, second, and third input lines;
first, second, third, fourth, fifth, and sixth output lines coupled to the autotransformer;
a first output capacitor coupled to the first and sixth output lines;
a second output capacitor coupled to the first and second output lines;
a third output capacitor coupled to the second and third output lines;
a fourth output capacitor coupled to the third and fourth output lines;
a fifth output capacitor coupled to the fourth and fifth output lines;
a sixth output capacitor coupled to the fifth and sixth output lines; and,
wherein at least one of the first, second, third, fourth, fifth and sixth output capacitors and an inductance associated with at least an output side of the autotransformer form an LC filter circuit configured to attenuate EMI prior to rectification without requiring a ground or neutral connection.

19. The system as defined in claim 18, further comprising a rectifier device coupled to the first, second, third, fourth, fifth, and sixth output lines.

20. The system as defined in claim 19, further comprising a DC filter coupled to the rectifier device.

21. The system as defined in claim 19, further comprising at least one of a first input capacitor coupled to the first and third input lines, a second input capacitor coupled to the first and second input lines and a third input capacitor coupled to the second and third input lines.

* * * * *